Jan. 21, 1936.  P. BRÜHL ET AL  2,028,315
GRINDING MACHINE
Filed April 14, 1933   2 Sheets-Sheet 1
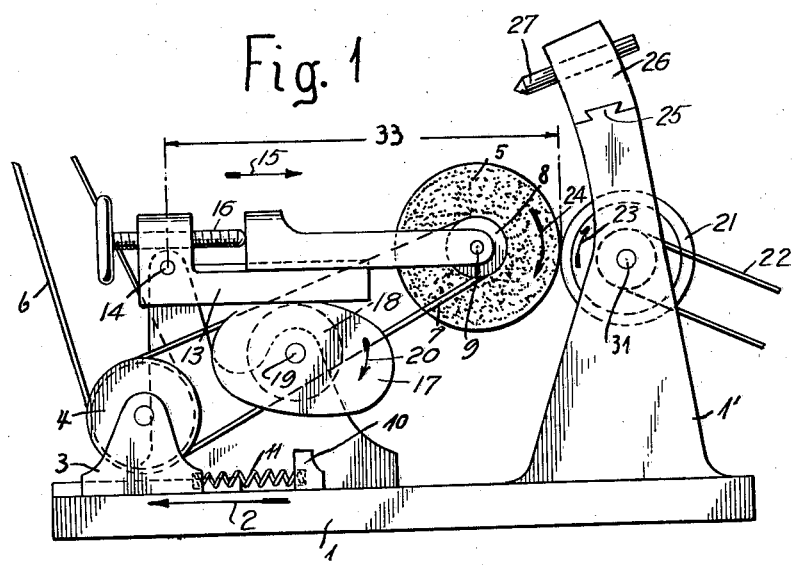
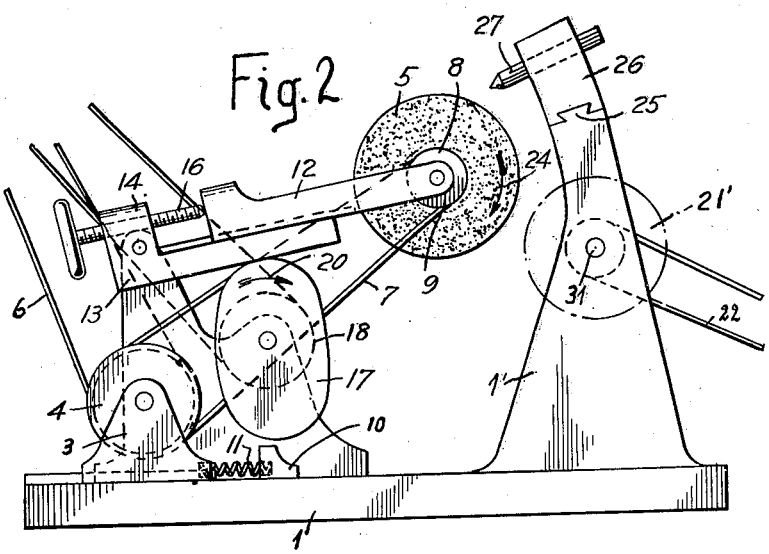
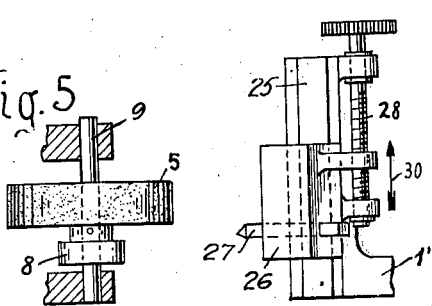
WITNESSES:
Hildegard van Straelen
INVENTORS:
PAUL BRÜHL
FRANZ NEUGART Jan. 21, 1936.                P. BRÜHL ET AL                2,028,315
                              GRINDING MACHINE
                      Filed April 14, 1933          2 Sheets-Sheet 2
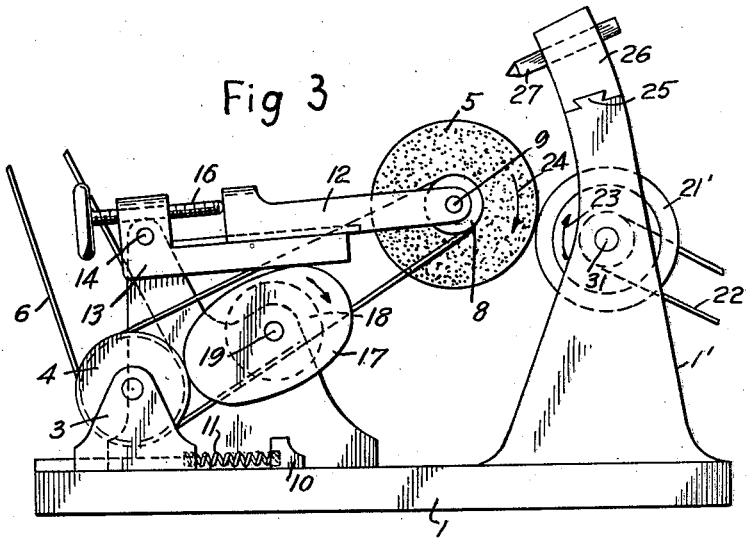
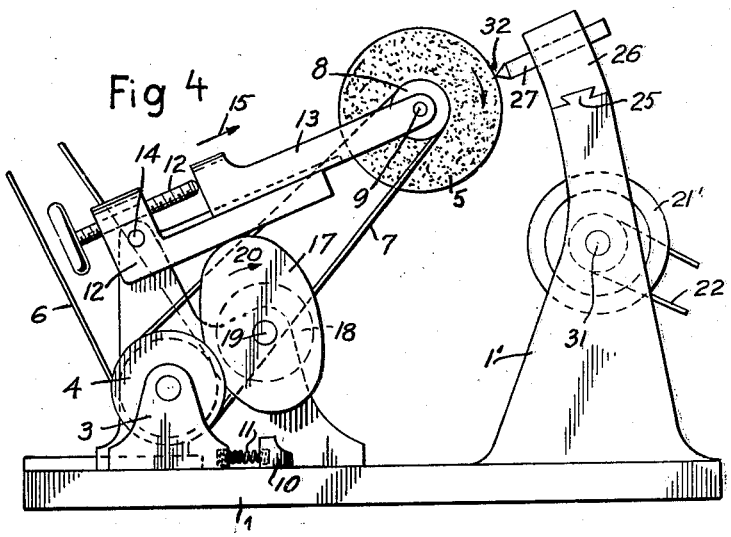
WITNESSES:
Hildegard van Straelen
R. Conrad
INVENTORS:
PAUL BRÜHL
FRANZ NEUGART Patented Jan. 21, 1936

2,028,315

UNITED STATES PATENT OFFICE 2,028,315

GRINDING MACHINE

Paul Brühl and Franz Neugart, Berlin, Germany

Application April 14, 1933, Serial No. 666,186
In Germany April 20, 1932

5 Claims. (Cl. 51—105)

This invention relates to grinding machines in which the grinding disk is trued at certain intervals by means of a diamond which either is at rest or reciprocates in a parallel movement to the axis of rotation of the grinding disk.

The object of this invention is to provide a grinding machine in which it is possible to obtain, without the use of measuring instruments with the machine once adjusted, work of exact dimensions within the required fit limits, which work is accurately ground by a corresponding arrangement of a truing diamond and controlling means at the grinding disk causing the finish grinding of the work to the desired final dimension to be obtained with the grinding disk trued by the diamond and independently of the feed to which the grinding disk was adjusted before the truing and also independently of the external diameter which the grinding disk has at the operation, i. e. independently of whether it is already more or less worn down.

A grinding machine according to the invention is constructed in such a way that the machine is working continuously and that merely the work has to be changed by hand. Preferably it is constructed in such a way that the machine is permitted to be kept running during the changing of the work, if desired, with exception of the main spindle bearing the work.

The main feature of a grinding machine according to this invention is characterised in that the grinding disk is to be brought from its grinding position into the truing position opposite the point of the diamond by turning about a pivot, whereby the point of the diamond is positioned at a distance from the axis of rotation of the grinding disk which is greater than the distance of the contacting point of grinding disk and work from the axis of the grinding disk, when the grinding of the work has been finished, by an amount equal to the wear of the grinding disk when the work has been finished, and whereby the point of the truing diamond engages the grinding disk at the end of a radius which includes the same angle with the pivoted swinging arm, as the radius extending from the point of contact of the disk and the work at the moment the work is finished.

Practically all causes of inaccurate grinding of the work are eliminated in the grinding machine according to the invention, because the diamond support merely moves in a direction parallel to the axis of the grinding disk and the grinding disk is supported in bearings entirely without slack.

According to this invention external grinding machines as well as internal grinding machines can be constructed.

A grinding machine according to the invention further is constructed to automatically swing the grinding disk to the various working positions from the drive of the machine by means of a cam disk which preferably is of such a shape that the grinding disk remains in its grinding and truing positions for comparatively long periods.

Of course the movement of the diamond must be adapted to the profile of the grinding edge, if the latter is of curved shape, the diamond must move also along a curved line.

The drawings represent by way of example a grinding machine according to the invention.

Fig. 1 shows, as far as necessary for understanding the invention, a side view of the grinding machine at the moment of finishing the surface of a disk or ring shaped workpiece.

Fig. 2 indicates the position of the parts during the insertion of a new work piece and Figs. 3 and 4 show respectively, the position of the parts at the beginning of the grinding of a new work piece and during the truing of the grinding disk.

Fig. 5 is a partly sectional plan view of the grinding disk and the means for guiding the truing diamond.

Referring now to the drawings, 1 is the frame of the external grinding machine. In a support 3 slidable on the frame 1 in the direction of arrow 2 and in the opposite direction the driving pulley 4 for the grinding disk 5 is mounted rotatably. This driving pulley 4 is operated by the belt 6 and by cord or belt 7 rotates a pulley 8 on the shaft 9 of grinding disk 5. A spring 11 disposed between a fixed part 10 of the machine frame and support 3 tends to push support 3 in the direction of arrow 2 and hereby continuously maintains the necessary tension of cord or belt 7.

The shaft 9 of grinding disk 5 is supported in part 12 of an arm 12, 13. Part 13 of this lever is mounted to swing about a pivot 14 of the machine frame, and part 12 can be moved on part 13 in the direction of arrow 15 and in the opposite direction by means of a sliding guide.

The position of lever part 12 relative to lever part 13 can be adjusted by means of an adjusting screw 16. In the frame 1 a cam disk 17 is rotatably mounted which is rotated in the direction of arrow 20 by means of a pulley 18 mounted on the shaft 19 of cam disk 17. The part 13 of arm 12, 13 is permanently in engagement with the cam disk 17.

The work which may be a ring 21, as shown, or a disk, is placed on a spindle 31 in an upright 1' on the frame 1, and rotated by a belt 22 and a pulley on the spindle. The work and the grinding disk rotate as indicated by arrows 23 and 24, respectively, but the grinding disk rotates much faster. 25 is a dovetailed guide at the upper end of upright 1' and 26 is a diamond holder on the guide, with a diamond 27 having the point 32. The holder 26 is moved by a threaded spindle 28, with a hand wheel at its outer end.

The operation of the machine is as follows:

Fig. 1 shows the position of arm 12, 13 in which the work 21 is finished. The axis of shaft 9 is at a slightly higher level than the axis of spindle 31, and the distance 33 of the point where the grinding disk engages the work, from the axis of pivot 14, is equal to the distance of the point 32 from such axis. The shape of cam disk 17 is such that after the work has been finished, the cam disk allows the arm 12, 13 and the grinding disk 5 to sag for a small amount until the axes of pivot 14, shaft 9, and work spindle 31, are in the same plane. From this position, the shorter arm of cam disk 17 raises the swinging arm 12, 13 into the work-exchanging position shown in Fig. 2. The finished work piece 21 is now removed, and replaced by another work piece 21, the machine being stopped if required. Upon further rotation of the cam disk 17, the arm 12, 13 is lowered into the roughing position, Fig. 3, in which the shaft 9 of the grinding disk is at a somewhat higher level than in the finishing position, Fig. 1. The work is roughed to about .01 mm. oversize. The cam disk 17 rotates further and its longer arm now moves the arm 12, 13 into the truing position, Fig. 4, and the part 13 which holds the shaft 9, is advanced by spindle 16 in the direction of arrow 15. In this position, the point 32 of the diamond 27, the shaft 9 of the grinding disk 5, and the pivot 14 are in the same plane. The point of the diamond and the extreme point of the work piece 21 or 21' are located exactly in the arc described by the extreme outer point of the grinding disk 5 in its trued condition. The diamond is located within the arc described by the disk about pivot 14 and the disk moves beyond the diamond upon each swinging movement of arm 12, 13, being trued roughly upon its movement away from the work piece, and finished upon its return toward the work piece. During the movement of disk 5 from the piece of work, the disk is moved from the axis of pivot 14 by an amount which is at least greater than the wear of the disk incurred during the preceding grinding operation.

When the disk 5 is in truing position, the diamond 5 is at one side of the disk, as shown in Fig. 5, and is now moved in the direction of the arrow 30 to true the disk. The diamond is adjusted in its holder 26 so that the distance of its point 32 from the axis of pivot 14 is equal to the distance 33, Fig. 1. By these means, it is assured that each work piece will be ground exactly to size.

From the truing position, Fig. 4, the cam disk 17 returns the grinding disk 5 into the substantially horizontal position of arm 12, 13 in which the work is finished and finally allows the arm to sag, as described. The cycle of operations is now completed.

While the form of mechanism herein shown and described constitutes a preferred form of embodiment of the invention it is to be understood that other forms might be adopted, all coming within the scope of the claims which follow.

What we claim is as follows:

1. In a grinding machine, an arm adapted to swing between two given positions, a grinding disk mounted at the end of the said arm, a diamond and a work-holder disposed substantially in a plane with the said disk on either side thereof and so positioned that the extreme points of the said diamond and the piece of work on the said holder situated towards the axis of oscillation of the said arm are located exactly in the arc described by the extreme outer point of the said disk in its trued condition, means for swinging the said disk to and fro for operative engagement with the piece of work and the said diamond, and means for advancing the said disk in a direction away from the said axis during the movement of the said disk from the piece of work to the said diamond by an amount which is at least greater than the depth of wear of the said disk incurred during the preceding grinding operation.

2. In a grinding machine, an arm adapted to swing between two given positions, a grinding disk mounted at the end of the said arm, a diamond and a work-holder disposed substantially in a plane with the said disk on either side thereof and so positioned that the extreme points of the said diamond and the piece of work on the said holder situated towards the axis of oscillation of the said arm are located exactly in the arc described by the extreme outer point of the said disk in its trued condition, the said diamond being located within the arc of movement of the said disk, so that upon each swinging movement of the said disk the latter moves beyond the said diamond and is trued roughly upon its movement away from the piece of work and finally trued upon its return movement towards the piece of work, means for swinging the said disk, and means for advancing the said disk in a direction away from the said axis during the movement of the said disk from the piece of work to the said diamond by an amount which is at least greater than the depth of wear of the said disk incurred during the preceding grinding operation.

3. In a grinding machine, an arm adapted to swing between two given positions, a grinding disk mounted at the end of the said arm, a diamond and a work holder disposed substantially in a plane with the said disk on either side thereof and so positioned that the extreme points of the said diamond and the piece of work on the said holder situated towards the axis of oscillation of the said arm are located exactly in the arc described by the extreme outer point of the said disk in its trued condition, the piece of work on the said holder being located within the arc of movement of the said disk, so that upon each swinging movement of the said disk the latter moves beyond the piece of work and grinds the same roughly upon its movement away from the said diamond and finally grinds the same upon its return movement towards the said diamond, means for swinging the said arm and disk, and means for advancing the said disk in a direction away from the said axis during the movement of the said disk from the piece of work to the said diamond by an amount which is at least greater than the depth of wear of the said disk incurred during the preceding grinding operation.

4. In a grinding machine, an arm adapted to swing between two given positions, a grinding disk mounted at the end of the said arm, a diamond and a work-holder disposed substantially in a plane with the said disk on either side thereof and so positioned that the extreme points of the said diamond and the piece of work on the said holder are located exactly in the arc described by the extreme outer point of the said disk in its trued condition, a cam in permanent contact with the said arm for causing the swinging movement of the said arm and disk and so shaped that the rate of movement of the said arm is retarded in its extreme positions, and means for advancing the said disk in a direction away from the axis of oscillation of the said arm during its movement from the piece of work to the said diamond by an amount which is at least greater than the depth of wear of the said disk incurred during the preceding grinding operation.

5. In a grinding machine, an arm adapted to swing between two given positions, a grinding disk mounted at the end of the said arm, a diamond and a work-holder disposed substantially in a plane with the said disk on either side thereof and so positioned that the extreme points of the said diamond and the piece of work on the said holder are located exactly in the arc described by the extreme outer point of the said disk in its trued condition, means for swinging the said arm and disk, and means for extending the said arm to a desired extent for advancing the said disk in a direction away from the axis of oscillation of the said arm during its movement from the piece of work to the said diamond by an amount which is at least greater than the depth of wear of the said disk incurred during the preceding grinding operation.

PAUL BRÜHL.
FRANZ NEUGART.